(12) United States Patent
Lesur et al.

(10) Patent No.: US 10,765,124 B2
(45) Date of Patent: Sep. 8, 2020

(54) METHOD FOR PRODUCING A CHEESE AND CHEESE PRODUCED

(71) Applicant: INGREDIA, Arras (FR)

(72) Inventors: Céline Lesur, Arras (FR); Franck David, Beaurains (FR); Jean Jacques Snappe, Festubert (FR)

(73) Assignee: INGREDIA, Arras (FR)

( * ) Notice: Subject to any disclaimer, the term of this patent is extended or adjusted under 35 U.S.C. 154(b) by 359 days.

(21) Appl. No.: 14/892,612

(22) PCT Filed: May 21, 2014

(86) PCT No.: PCT/FR2014/051186
§ 371 (c)(1),
(2) Date: Nov. 20, 2015

(87) PCT Pub. No.: WO2014/188123
PCT Pub. Date: Nov. 27, 2014

(65) Prior Publication Data
US 2016/0100600 A1    Apr. 14, 2016

(30) Foreign Application Priority Data
May 21, 2013  (FR) .................... 13 54517

(51) Int. Cl.
*A23C 19/028*  (2006.01)
*A23C 19/076*  (2006.01)
(Continued)

(52) U.S. Cl.
CPC ............ *A23C 19/028* (2013.01); *A23C 19/05* (2013.01); *A23C 19/053* (2013.01);
(Continued)

(58) Field of Classification Search
CPC .................... A23C 19/028; A23C 19/0684
(Continued)

(56) References Cited

U.S. PATENT DOCUMENTS 3,891,777 A * 6/1975 Boyer .................. A23C 20/005
                                                                     426/506
4,226,888 A * 10/1980 Siecker .............. A23C 19/0684
                                                                      426/36
(Continued)

FOREIGN PATENT DOCUMENTS

FR      2875107 A1    3/2006
FR      2911044 A1    7/2008
(Continued)

OTHER PUBLICATIONS

Mozzarella—Wikipedia, the free encyclopedia, Jan. 27, 2012, pp. 1-7, URL:https://web.archive.org/web/20120127214845/http://en.wikipedia.org/wiki/Mozzarella.
(Continued)

*Primary Examiner* — Jeffrey P Mornhinweg
(74) *Attorney, Agent, or Firm* — MH2 Technology Law Group, LLP (57) ABSTRACT

The invention relates to a method for producing a cheese having spreading and/or ropy properties when cooked, said cheese being produced from powdered milk protein concentrates. Especially the ratio of the weight of the calcium to the weight of the total nitrogenous matter (Ca/TNM) in said milk protein concentrates is greater than or equal to 0.10% and less than or equal to 2.80%.

19 Claims, 4 Drawing Sheets (51) Int. Cl.
*A23C 19/05* (2006.01)
*A23C 19/055* (2006.01)
*A23C 19/068* (2006.01)

(52) U.S. Cl.
CPC ........ *A23C 19/055* (2013.01); *A23C 19/0684* (2013.01); *A23C 2250/052* (2013.01)

(58) Field of Classification Search
USPC .......................................................... 426/39
See application file for complete search history.

(56) References Cited

U.S. PATENT DOCUMENTS

| | | | |
|---|---|---|---|
| 4,419,943 | A | 12/1983 | Faurholdt |
| 4,460,609 | A | 7/1984 | Kristiansen |
| 4,919,943 | A | 4/1990 | Yee |
| 5,431,931 | A | 7/1995 | Nauth |
| 6,185,762 | B1 | 2/2001 | Homeyer |
| 6,485,762 | B1 | 11/2002 | Rizvi |
| 7,192,619 | B2 | 3/2007 | Dybing et al. |
| 2005/0238783 | A1 | 10/2005 | Han |
| 2005/0249854 | A1* | 11/2005 | Merrill ................ A23C 19/084 426/582 |
| 2006/0159804 | A1 | 7/2006 | Bhaskar |

FOREIGN PATENT DOCUMENTS

| | | |
|---|---|---|
| JP | 2002125589 A | 5/2002 |
| WO | 2006/030128 A1 | 3/2006 |
| WO | 2009/150183 A1 | 12/2009 |

OTHER PUBLICATIONS

T.P. Guinee et al, Effect of pH and Calcium concentration on some textural and functional properties of mozzarella cheese, Journal of dairy science, vol. 85, No. 7, 2002, pp. 1655-1669 ISSN: 0022-0302, DOI: 10.3168/jds.S0022-0302(02)74238-0.

Jana A H et al, Manufacturing and quality of mozzarella cheese: a review, Internation Journal of dairy science: vol. 6, No. 4, 2011, pp. 199-226 ISSN: 1811-9743.

Notice of Preliminary Rejection dated Dec. 11, 2018 in KR Application No. 10-2015-7034309, 9 pages.

* cited by examiner

METHOD FOR PRODUCING A CHEESE AND CHEESE PRODUCED

The present invention relates to a method for producing a cheese that spreads and/or stretches when cooked, in particular a production method implementing powdered milk protein concentrates.

BACKGROUND OF THE INVENTION

The production of cheese from dried milk is well known. This way of producing cheeses is particularly advantageous because it makes it possible to dissociate in time and place the production of cheeses from the supply of fresh milk. This makes possible in particular the production of cheese according to demand and/or in regions not having their own milk sources.

The known methods for producing cheese from powdered milk are fast methods that produce cheese in only a few steps: mix powdered milk with water, solutions of acids or of fat, optional addition of enzymes, heating of the resulting mixture, addition of various additives. Generally, the cheeses thus produced are fresh or processed cheeses.

The document EP 1 788 884 B1, however, discloses the production of a traditional- or ripened-type cheese implementing lactose-depleted milk protein concentrates, thus avoiding a step of separating the whey formed.

Also known is WO 2009/150183 A1, which discloses the production of calcium-depleted milk protein concentrates using a calcium sequestrant added to skimmed milk or to the permeate resulting from the microfiltration of skimmed milk, such as citric acid or sodium citrate. The powdered protein concentrates thus have calcium and phosphate contents determined for the preparation of a liquid pre-cheese allowing the calcium phosphate, and thus the pH and the buffer capacity of the cheese to be controlled at levels that do not lead to a significant development of cultures and thus to the formation of a bitter cheese. Calcium-depleted milk protein concentrates can have a ratio of calcium to total nitrogenous matter (TNM) between 0.1% and 4%. The latter value of 4% is very high and would correspond to a milk protein concentrate the calcium value of which has not been modified. Indeed, the weight ratio of calcium to TNM in a milk protein concentrate not having undergone an acidification step to release calcium is normally around 3% and above.

WO 2009/150183 also discloses the production of cheeses which would be produced from milk protein concentrates having undergone the addition of calcium sequestrant(s) during their synthesis. Nevertheless, two cheeses tested, NCTP1 and NCTP2, have high final weight ratios of calcium to TNM of 3.36% and 3.26%, which correspond to the use of milk protein concentrates the weight proportion of calcium of which have not been lowered. Moreover, the spreading value obtained in Table 4 for a cheese having a dry extract of 51% is 116%. This value is low, even insignificant, since the standard deviation of this value is generally about ±15%. The cheeses produced thus do not have satisfactory spreading properties with a high dry extract.

WO 02/082917 A1 discloses the production of milk protein concentrates the calcium content of which has been modified, and the use thereof in the production of gels. Example 10 does not relate to the production of a cheese since no coagulating enzyme is added to the dough. Only lactic acid as an acidifying agent is added to the dough, which seems equivalent to an increase in mass such as that produced for a yogurt. Moreover, the stirring speed is 120 rpm, which does not provide good hydration and good emulsification of milk proteins. Example 10 thus refers to the consistency of the product produced and not to its spreading and/or stretching when cooked.

U.S. Pat. No. 4,460,609 discloses the production of a mozzarella-type cheese from milk protein concentrates the calcium content of which has not been modified, and requiring a whey separation step. However, the aim of the present invention is to avoid any separation step. U.S. Pat. No. 4,419,943 discloses the production of a mozzarella-type cheese from protein concentrates undergoing an acidification step for adjusting the proportion of calcium bound to the casein in order to carry out subsequent distinct operations on the casein and the whey proteins, in particular concentrating the latter and modifying the whey proteins by proteolysis.

U.S. Pat. No. 4,419,943 discloses the production of a cheese from milk protein concentrates whose proportion of calcium to TNM, i.e., comprising soluble calcium and insoluble calcium, has not been modified.

SUBJECT-MATTER AND SUMMARY OF THE INVENTION

The present invention aims to propose a method for producing a cheese that spreads and/or stretches when cooked, which may be adapted according to the composition of the cheese in dry extract, in fat in dry matter and in total nitrogenous matter. The present invention thus seeks to propose a method for producing a whole range of values of spreading and/or stretching when cooked, including some similar to those produced for traditional cheeses.

The present invention aims in particular at producing a mozzarella-type cheese with a low moisture content, which is a firm/semi-hard homogeneous cheese without holes, suitable for shredding.

According to the Codex Standards, the official name "Mozzarella" is reserved for cheeses having a fat in dry extract greater than or equal to 45% and comprising a minimum dry matter content of 45%. In general, the weight ratio of the total nitrogenous matter in a traditional mozzarella is greater than or equal to 23%.

Mozzarella with low moisture content should not be confused with mozzarella with high moisture content, which is a soft cheese with overlying layers that may form pockets containing liquid of milky appearance. This mozzarella may be packed with or without the liquid. This cheese has a near white colour.

The preceding definitions are from the Codex Standard for mozzarella (CODEX STAN 262-2006, amended in 2006).

The present invention also aims at a method for producing a cheese with no whey separation step.

The present invention thus has as its subject-matter, according to a first aspect, a method for producing a cheese that spreads and/or stretches when cooked comprising the following successive steps:

i) introducing, into a solid-liquid mixer, a base composition comprising water, fat and milk protein concentrates;

ii) operating the mixer at a stirring speed greater than or equal to 1500 rpm and a temperature T1 between 35° C. and 60° C., so as to emulsify and homogenize said composition, then deaerating same under vacuum, until a homogeneous, emulsified and deaerated dough, or pre-cheese mix, is obtained;

iii) a step of cooling the dough at a temperature T2 below temperature T1, preferably between 35° C. and 55° C., iv) a coagulation step during which one or more coagulating enzymes, and optionally one or more acidification ferments and/or one or more aromatic enzymes modifying rheological properties and/or one or more flavour-producing ferments and/or one or more acidifying agents, are added to the cooled dough, v) a step of texturing the cheese comprising the addition to said dough of steam or hot water at a temperature T3 greater than or equal to 45° C., and optionally comprising beforehand a grinding step, vi) a moulding/unmoulding step.

Advantageously, the weight ratio of calcium to total nitrogenous matter (TNM) in said milk protein concentrates is greater than or equal to 0.10% and less than or equal to 2.80% and the method does not comprise a step of separating the whey formed after the coagulation step iv).

Preferably, according to the definition of the Codex Alimentarius, milk proteins are defined as milk products containing a minimum of 50% milk proteins calculated as a function of the dry extract (nitrogen×6.38). The total nitrogenous matter (TNM) thus comprises milk proteins and non-protein nitrogenous matter.

The milk protein concentrates used in the context of the present invention may be in powder form and/or liquid form.

Preferably, the milk protein concentrates are in powder form when it is wanted to dissociate the synthesis of said protein concentrates from their site of use, in particular in order to facilitate their storage.

In the context of the present invention, the calcium taken into account in calculating the Ca/TNM ratio is that of total calcium, i.e., comprising soluble calcium and insoluble calcium bound to proteins, in particular to casein.

The calcium content of a milk product, in particular a milk protein concentrate, may be determined by atomic absorption spectrometry according to the FIL 119 (International Dairy Federation)—ISO 8070 (International Organization for Standardization) method dating from 2007.

Advantageously, implementing the various steps mentioned above, while respecting the temperature, stirring speed and vacuum packing criteria, combined with the use of milk protein concentrates having a calcium Ca/TNM ratio in a given interval, makes it possible to produce cheeses having improved spreading and/or stretching properties, close to traditional cheeses, such as mozzarella, for example.

One of the merits of the invention is to be able to produce a cheese that spreads and/or stretches when cooked from milk protein concentrates by means of adjusting the Ca/TNM weight ratio for a whole range of cheeses according to their dry extract, fat in dry matter, and TNM.

Preferably, the term "when cooked" is understood to mean any operation consisting in transforming the cheese in such a way that it spreads and/or is ropy if it is spinned by exposing it to a heat source; preferably said heat source is greater than or equal to 60° C., more preferably greater than or equal to 100° C., in particular greater than or equal to 150° C., more particularly greater than or equal to 250° C.

Preferably, "spreads when cooked" is understood to mean any cheese that spreads by more than 0%, in particular by 20% or more, preferably by 60% or more, more preferably by 120% or more, when heat at roughly 270° C. is applied for 6.5 minutes, in particular according to the method disclosed in paragraph II below.

Preferably, "stretches when cooked" is understood to mean any cheese that stretches by 20 cm or more, more preferably by 40 cm or more measured according to the method disclosed in paragraph I a) or when exposed to a temperature of 270° C. for 6.5 minutes, in particular as disclosed in paragraph I b).

Preferably, the base composition comprises at least 15% by weight of its total weight (including water), preferably at least 20% by weight of its total weight, and more preferably at least 25% by weight of its total weight and at the most 40% by weight of its total weight, of milk protein concentrates, in particular powdered.

Preferably, the base composition comprises at least 40% water, more preferably at least 45% water, expressed in % of the total weight of said base composition, and more preferably at the most 60% water, more preferably at the most 50% water, expressed in % of the total weight of said base composition.

Preferably, the total quantity of fat(s) added to the base composition, and optionally after step ii) or the cooling step iii), represents at least 15% by weight of the total weight of the base composition (including water), more preferably at least 20% by weight of the total weight of the base composition, and more preferably at the most 35% by weight of the total weight of the base composition.

One of the merits of the invention is to propose a production method with no step of separating the whey formed after the coagulation step iv) independently of the weight ratio of the TNM in the milk protein concentrates. Indeed, according to the invention, no whey separation step is necessary even when the milk protein concentrates comprise more than 10% by weight of lactose in relation to their total weight. In the latter case, it is possible to adjust the dry extract of the final cheese according to the weight proportions of water, fats and powdered milk protein concentrates in the base composition.

Preferably, during the texturing step, the spinning and stretching steps are carried out on the dough. In particular, the spinning and stretching steps are merged. Indeed, when the dough is stretched, it is also spinned.

Preferably, steam is injected into the dough. It is thus observed that the properties of spreading and ropy when cooked are improved compared to when hot water is injected.

A "grinding step", in the present text, is understood to mean any step consisting in cutting the dough into small pieces in view of its subsequent texturing.

The method of the invention optionally comprises a salting step (for example brining) and/or a ripening step following the moulding/unmoulding step (vi). This ripening step is not, in the classic sense, a ripening step in the production of traditional/ripened-type cheeses. Indeed, ripening in the context of the present invention generally lasts a maximum of one month. Moreover, the ferments having been destroyed during the texturing step v), the purpose of this step is not to develop particular flavours in the cheese, as is the case for traditional/ripened cheeses, but to improve the physical functionalities of the cheese, in particular spreading and ropy when cooked.

The 1500 rpm stirring speed indicated in step ii) is the stirring speed that must be applied to the mixture until a homogeneous and deaerated dough is obtained, preferably for at least 5 minutes, more preferably for at least 10 minutes, and still more preferably for at least 15 minutes.

In an alternative embodiment, the method of the invention comprises, after step ii), in particular before the heat treatment step, and/or after the cooling step iii), the addition of fat, preferably under vacuum.

Surprisingly, the addition of fat after step ii) and/or step iii), preferably after step ii), in particular after step iii), very significantly improves the spreading value of the cheese compared to a cheese comprising the same quantity of fat but added in a single step in the base composition in step i).

The addition of fat after step ii) and/or after step iii) must be carried out so as to obtain a homogeneous, emulsified and deaerated dough.

The fat is added preferably in the molten state, particularly at a temperature greater than or equal to 45° C., in particular about 45° C.

The fat is added preferably with stirring, in particular with a stirring speed greater than or equal to 300 rpm, more preferably greater than or equal to 500 rpm, and more preferably greater than or equal to 750 rpm.

In an alternative embodiment, the quantity by weight of fat added after step ii) and/or after step iii) is greater than or equal to the quantity by weight of the total fats added to the base composition in step i), preferably greater than or equal to twice the quantity by weight of the total fats added to the base composition in step i).

In an alternative, the texturing step v) comprises steps of spinning and stretching, in particular after the addition of hot water or steam to the dough produced at the conclusion of the coagulation step iv).

In an alternative, the method comprises a kneading step during which the dough is mixed using a stirring system, for example using a screw. Said kneading step preferably takes place before the texturing step v) and before or after the grinding step.

In an alternative, the weight ratio of calcium to TNM in the milk protein concentrates is between 1.20% and 2.80%, preferably between 1.70% and 2.70%.

Advantageously, the Ca/TNM weight ratios make it possible to produce cheeses having properties of spreading and ropy when cooked which are very close to, even similar to, those of traditional cheeses but also making it possible to obtain spreading and ropy characteristics according to the requirements of consumers.

Preferably, the Ca/TNM ratio is between 1.70% and 2.50%, more preferably between 1.70% and 2.30%.

In one alternative, the coagulation step iv) comprises the acidification of said cooled dough at a pH greater than or equal to 5.10 and less than or equal to 5.40.

The acidification may be carried out using one or more acid agents as described below.

In one alternative, the powdered milk protein concentrates comprise less than 10% by weight of lactose in relation to their total weight.

The low lactose content has the advantage of avoiding any browning when the cheese is cooked.

In one alternative, the TNM represents at least 50% by weight and at the most 85% by weight of the total weight of the powdered milk protein concentrates.

Preferably, the TNM represents at least 60% by weight of the total weight of the powdered milk protein concentrates.

In one alternative, the pre-cheese mix has a dry matter content of 40% to 65%, preferably of 45% to 55%.

One of the merits of the invention is to be able to vary the dry matter contents while producing satisfactory properties of ropy and spreading when cooked.

Preferably, the dry matter content is between 47% and 53%.

In one alternative, the method of the invention comprises the addition of salt during step (i), and/or step (ii) and/or step (iii) and/or the grinding step and/or the texturing step (v), and optionally during a brining step.

In one alternative, the milk protein concentrates have a casein/TNM weight ratio greater than 0.50, preferably greater than 0.70, more preferably greater than 0.80 and below 0.95, and more preferably between 0.85 and 0.95.

In one alternative, the TNM/water weight ratio of the base composition is between 0.20 and 0.90, preferably between 0.30 and 0.90, more preferably between 0.30 and 0.70, more particularly between 0.40 and 0.60.

In one alternative, the one or more acid agents are selected from the following acids: chemical acids, such as hydrochloric acid, sulphuric acid, phosphoric acid, lactic acid, citric acid, acetic acid; biological acids such as glucono delta-lactone.

In one alternative, the one or more acidification ferments are selected from homofermentative and/or heterofermentative lactic ferments, thermophilic and/or mesophilic ferments.

In one alternative, the one or more coagulating enzymes are selected from chymosin and/or pepsin.

In one alternative, the one or more aromatic enzymes modifying rheological properties are selected from a protease and/or a lipase.

In one alternative, the base composition comprises texturing agents, notably hydrocolloids, such as proteins, in particular gelatin and/or one or more polysaccharides, and starch.

In one alternative, the fat is a butyric and/or vegetable fat, preferably the butyric fat is selected alone or in combination from cream, butter, butter oil or anhydrous milk fat.

Optionally, the vegetable fat is selected alone or in combination from palm oil, coconut oil, copra oil, soybean oil, sunflower oil, in liquid or partially or fully hydrogenated form. In the latter case, it should be noted that the product resulting from the method of the invention may not be marketed under the name "cheese".

In one alternative, the method of the invention comprises a cooling step at the conclusion of the texturing step using cold water and/or ice water.

Preferably, this cooling step is carried out after the step of moulding (vi) and/or unmoulding.

Preferably, the cooling is carried out with cold water having a temperature between 2° C. and 6° C., more preferably about 4° C. Preferably, cooling with cold water is followed by cooling with ice water (i.e., about 0° C.).

In one alternative, the method of the invention comprises a heat treatment step at the conclusion of step ii), and before step iii), during which the dough is subjected to a temperature greater than or equal to 65° C. The latter step consists in a thermisation or a pasteurisation of the dough depending on the temperatures reached.

The invention also has as its subject-matter, according to a second aspect, a mozzarella-type cheese, such as mozzarella, produced in particular by implementing the production method of the invention and disclosed according to any one of the preceding alternative embodiments, having ropy and/or spreading properties when cooked and having a ratio of the weight of the TNM to the total weight of said cheese of less than or equal to 21%, a weight ratio of dry matter to the total weight of said cheese of greater than or equal to 40% and a weight ratio of calcium to said TNM between 0.10% and 2.80%.

The TNM content of the cheese is calculated in relation to the total weight of the cheese (including water).

Preferably, the dry matter content is greater than or equal to 45%, more preferably greater than or equal to 47% and less than or equal to 60%, more preferably less than or equal to 55%, and more preferably less than or equal to 53%. By "mozzarella-type cheese" is meant any cheese having ropy and/or spreading properties when cooked, having a low moisture content, homogeneous and firm/semi-hard without holes, and suitable for shredding.

One of the merits of the invention is to make it possible to obtain a cheese having a lower total nitrogenous matter content than cheeses produced using conventional technology with whey separation and ropy and/or spreading properties when cooked, and in particular ropy, from milk protein concentrates, in particular powdered.

In one alternative, the pH of said cheese is greater than or equal to 5.10 and less than or equal to 5.40.

In one alternative, the ratio of the weight of the TNM to the total weight of the cheese is between 15% and 22%, more preferably between 17% and 21%

This low TNM content represents an important economic gain for the cheese compared to TNMs greater than or equal to 23%.

In one alternative, the weight ratio of fat to the dry weight of the cheese (fat in dry matter) is between 40% and 60%, preferably between 44% and 59%.

BRIEF DESCRIPTION OF THE DRAWINGS

The present invention will be better understood on reading the example embodiments disclosed below, cited on a non-limiting basis, and illustrated by the following figures, appended hereto, wherein.

In FIGS. 2 to 6, the dotted grey histograms correspond to spreading measured in % increase and the cross-hatched histograms correspond to ropy measured in cm.

Figure 4:
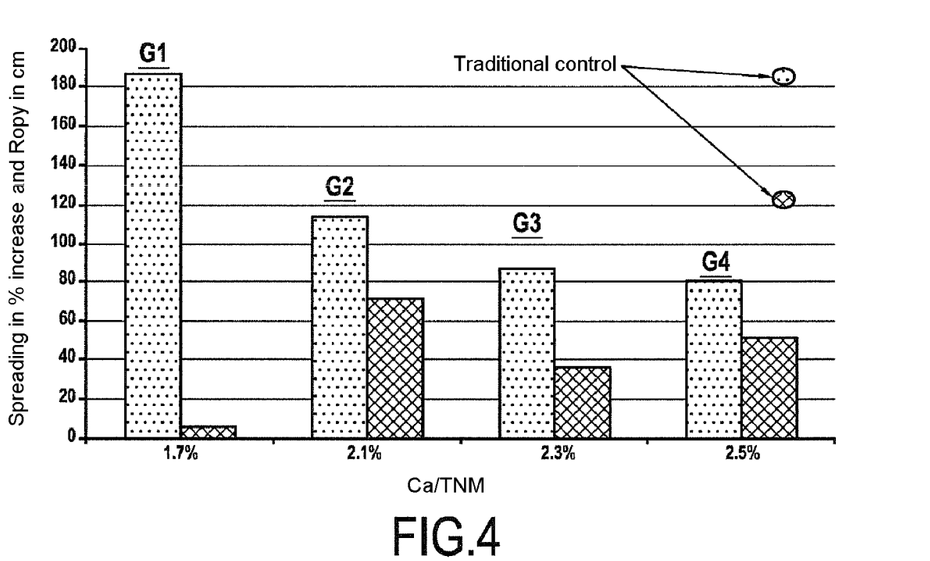
FIG. 4 is a graph of the spreading and ropy properties when cooked measured on cheeses by implementing a second example of the method of the invention. On the Y-axis are the ropy values in centimetres and the spreading values in % increase in relation to the dimensions of the initial sample, and on the X-axis are the ratios of the weight of calcium to the weight of the TNM in the powdered protein concentrates employed.

FIG. 4 presents the spreading and ropy values obtained for a traditional mozzarella, indicated as "Traditional control", having 50.6% dry extract, 22.2% fat in relation to its total weight, 23% TNM in relation to its total weight and 40-45% fat in dry matter.

DETAILED DESCRIPTION OF THE INVENTION

I a) Example Description of the Measurement of Ropy (cm)

Principle: Measurement of the length before breaking of the last string of processed cheese (measurement principle inspired by the Instron universal test machine). Measurement by vertical traction of a mobile harpoon placed in the cheese.

Materials: "Filometer" test machine, equipped with a temperature-controlled tank; mobile harpoon composed of six arms, provided with a plastic disc for retaining the harpoon and limiting evaporation; tall stainless-steel beakers (50 ml-70 ml); 90° C. water bath (±0.2° C.); precision balance.

Procedure:

1—Weigh in a beaker 17 g (±0.01 g) of freshly ground cheese to be tested;

2—Introduce the harpoon into the beaker without packing the cheese; the height of the harpoon (disc-arms) is defined and set during the design stage.

3—Place the beaker in a 90° C. water bath for 10 minutes.

4—Next, place the beaker in the Filometer's tank, set to 60° C., for 5 minutes.

5—Read, manually or automatically, the height of the mobile when the last string of processed cheese breaks.

6—Measure each cheese tested three times.

Presentation of the Results

Ropy corresponds to the length of the last string of cheese when it breaks (between 0 mm and 1200 mm).

The repeatability standard deviation is less than 30 mm, which is a coefficient of variation below 15%. This example of a stretching measurement was employed to test the cheeses G1 to G4 disclosed in reference to FIG. 4 and the cheeses H1 to H3 disclosed in reference to FIG. 5.

The cheeses A to F, I and J disclosed below were tested using a measurement method differing from the method disclosed above in the quantity of cheese introduced into each beaker, which is 30 g. The cheese tested is shredded manually and not ground. A beaker containing each sample of cheese to be tested is submerged in a water bath for 4 minutes and then the shaft already prepositioned at the bottom of the beaker is actuated to mix the processed cheese. Steps 5 and 6 of the procedure above are then performed.

Ib) Ropy property may also be measured by reproducing the various steps of the method disclosed in Ia) but while heating to 270° C. the beaker in step 3) for 6.5 minutes.

II—Description of the Measurement of Spreading (%)

Principle: To evaluate comparatively the ability of the cheeses tested to spread when melting. This method consists in measuring the spreading of a cylindrical sample of cheese on a grid after heating at a given temperature and for a given duration (270° C. for 6.5 minutes).

Materials: Round stainless-steel cutter (diameter 30 mm); 270° C. oven; glass plates; clips; a measuring sheet comprising a circular emplacement designed to receive the cut cheese sample before it melts, and from which six graduated axes project; a stop watch and a knife.

Preparation of Samples:

1—Cut a 30 mm thick section of processed cheese.
2—Cut out cylinders using the stainless-steel cutter, three cylinders per cheese to be tested. Make sure that the cheese samples are homogeneous (size, shape, etc.).

Procedure:

1—Set the oven to 270° C.
2—Slide the measuring sheet between two glass plates and clamp the plates together using the clips.
3—Place the sample on the central circle of the measuring sheet and put it in the oven.
4—Heat for 6.5 minutes at 270° C.
5—Remove the sample and allow it to cool for 10 minutes before reading.
6—Note the distance reached by the sample on the six points indicated on the six graduated axes of the measuring sheet.
7—Repeat the measurement three times.

Results: The mean of the six points measured on the six graduated axes is calculated, and the result is the mean of three experiments.

III—Description of Several Eexamples of Production Methods According to the Invention 1. Variation of the Total Nitrogenous Matter (TNM) Content of a Mozzarella-Type Cheese with 50% Dry Extract, and 44% Fat in Dry Matter, with a Calcium/TNM Weight Ratio of 2.00%

TABLE 1

| Base composition | Cheese A | Cheese B | Cheese C |
|---|---|---|---|
| Water (kg) | 29.22 | 29.22 | 28.74 |
| Fat: anhydrous milk fat (kg) | 13.5 | 13.56 | 13.68 |
| Milk protein concentrate (kg) | 16.5 | 16.44 | 16.8 |
| Salt (kg) | 0.78 | 0.78 | 0.78 |
| Total weight (kg) | 60.06 | 60.00 | 60.00 |
| Ratio of the weight of the TNM to the total weight of the milk protein concentrate (%) | 65 | 70 | 75 |
| Ratio of the weight of the TNM (%) to the total weight of the cheese | 17.90 | 19.2 | 21 |
| Total fat(s) (g)/dry cheese (weight) (%) | 43.8 | 44 | 43.8 |
| Ratio of the weight of the calcium to the weight of the TNM in the milk protein concentrates | 2.01% | 2.06% | 2.09% |

The three base compositions disclosed in table 1 above and corresponding to cheeses A, B and C are implemented according to a first example of the method of the invention, disclosed below and in reference to FIG. 1. Water is introduced into a mixer under vacuum, for example an Almix mixer (STM 100 Scanima turbo mixer Tetra Pak), and then double-wall heating at a temperature of about 50° C. is activated at a stirring speed of 710 rpm. Part of the molten extra-white anhydrous milk fat, or about a third of the total quantity of fat added to said cheese, is added under vacuum in the mixer at a temperature of about 50° C. and at a stirring speed of 710 rpm, and then the mixture of powdered milk protein concentrates is injected into the mixer under vacuum at a stirring speed of 1500 rpm, for 15 minutes for the formation of a homogeneous, deaerated and emulsified mixture, also called pre-cheese mix. The temperature of the dough T1 remains between 50° C. and 55° C. during this step ii). The dough obtained then undergoes a thermal treatment at a temperature T4 of 65° C. in said Almix double-wall mixer, at a stirring speed of 1500 rpm, then a cooling step iii) at a temperature T2 of about 45° C. and a stirring speed of 1000 rpm. The second portion of molten extra-white anhydrous milk fat, or about two-thirds of the total fat added to the cheese, is added under vacuum to the dough at a temperature T5 of 45° C. and a stirring speed of 1000 rpm. The ferments Chr HANSEN, STEM 05 (12 g), LHBO1 (6 g), and Chymax rennet (6.6 g) are then added to the dough in coagulation step iv). The dough thus supplemented is mixed at a stirring speed of 1000 rpm for 1 minute, then 30 kg of this dough is packed in a batch. An acidification at 47° C. is then carried out on the packed dough to form a curd until a pH of 5.20 is obtained, and then the 30 kg of curd is introduced into a laboratory vacuum mixer/cooker, such as the Karl Schnell 30 kg type 770, to undergo a spinning step. The curd is kneaded for 1 minute, supplemented with of 450 g of salt, at a speed of 100 rpm. The curd then undergoes a texturing step (v) during which it is heated at 64° C. with direct steam injection and then kneaded for 4 min using a screw turning at 100 rpm. The dough is then stretched/spinned for 1 minute. A homogeneous and shiny white mass is then observed. The dough is then moulded, step (vi), in cylindrical moulds 80 mm in diameter and 240 mm in height and then cooled for 30 minutes in ice water and then at 4° C. in cold water. After 30 days of storage at 4° C., the results shown in the graph of FIG. 2 are obtained.

Advantageously, there is no whey separation step.

Figure 1:
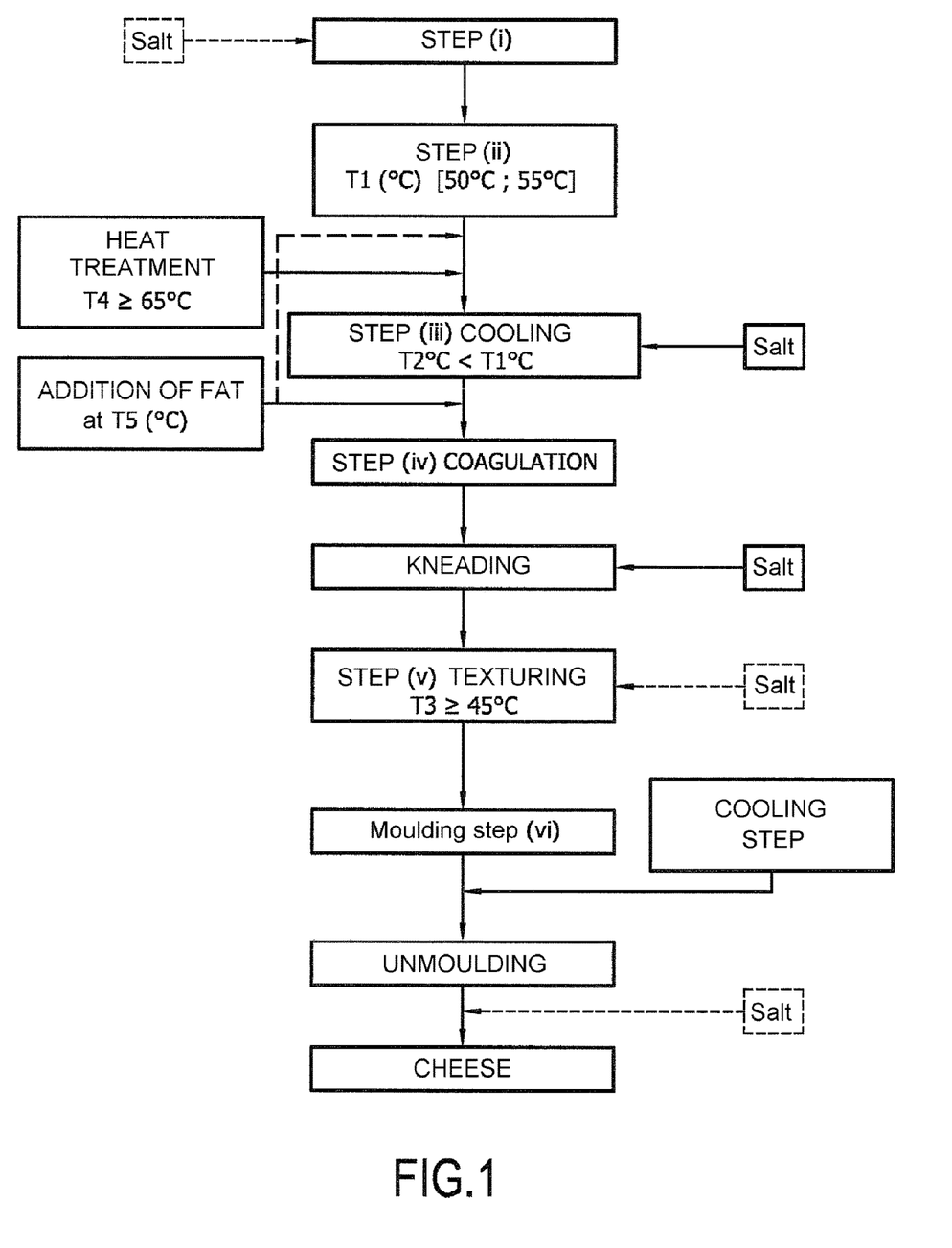
FIG. 1 is a schematic representation of the various steps implemented in a first example of the production method of the invention.
Figure 2:
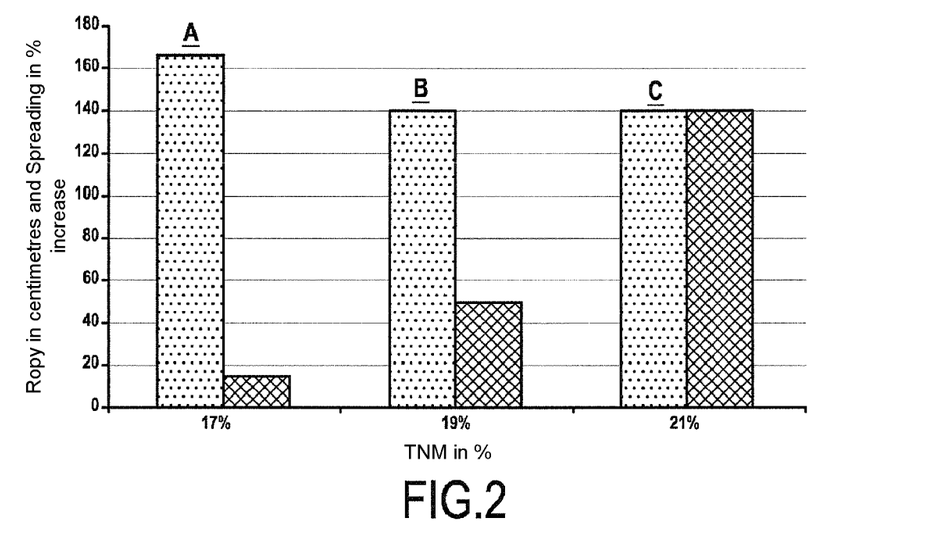
FIG. 2 is a graph of the spreading and ropy properties when cooked measured on cheeses by implementing the first example of the method of the invention. On the Y-axis are the ropy values in centimetres and the spreading values in % increase in relation to the dimensions of the initial sample, and on the X-axis are the ratios of the weight of the TNM in a tested cheese to the total weight of said cheese.

FIG. 1 shows using solid lines the various steps of the first example of the method of the invention. The dashed lines represent alternatives of said first example of the method, and the salt may thus be added in step i) and/or step iii) and/or in step v) and/or after the unmoulding step. The second portion of fat may be added at the conclusion of step ii), preferably before the heat treatment step.

On reading this chart, stretching properties close to 20 cm at the least for cheese A, and ranging up to 140 cm for cheese C, are observed. The spreading properties are satisfactory in all the cases, but are optimised for a total nitrogenous matter content of 17.90%. These advantageous results were obtained for cheeses A, B and C for calcium/TNM weight ratios between 2.01% and 2.09%.

2. Variation of the Total Dry Extract of a Mozzarella-Type Cheese having 19% by Weight of its Total Weight of TNM, 45% Fat(s) (a)/Dry Cheese (a) with a Calcium/TNM Weight Ratio of 2.00%.

TABLE 2

| Base composition | Cheese D | Cheese E | Cheese F |
|---|---|---|---|
| Water (kg) | 31.08 | 29.22 | 27.42 |
| Fat: anhydrous milk fat (kg) | 12.78 | 13.56 | 14.28 |
| Milk protein concentrate (kg) | 15.30 | 16.44 | 17.58 |
| Salt (kg) | 0.84 | 0.78 | 0.72 |
| Total weight (kg) | 60.00 | 60.00 | 60.00 |
| Weight ratio of the TNM in the milk protein concentrate (%) | 73.00 | 68.00 | 64.00 |
| Calcium/TNM weight ratio in the milk protein concentrate | 2.00% | 1.96% | 1.97% |
| Total dry matter/total weight of the cheese (dry extract) | 47% | 50% | 53% |

Figure 3:
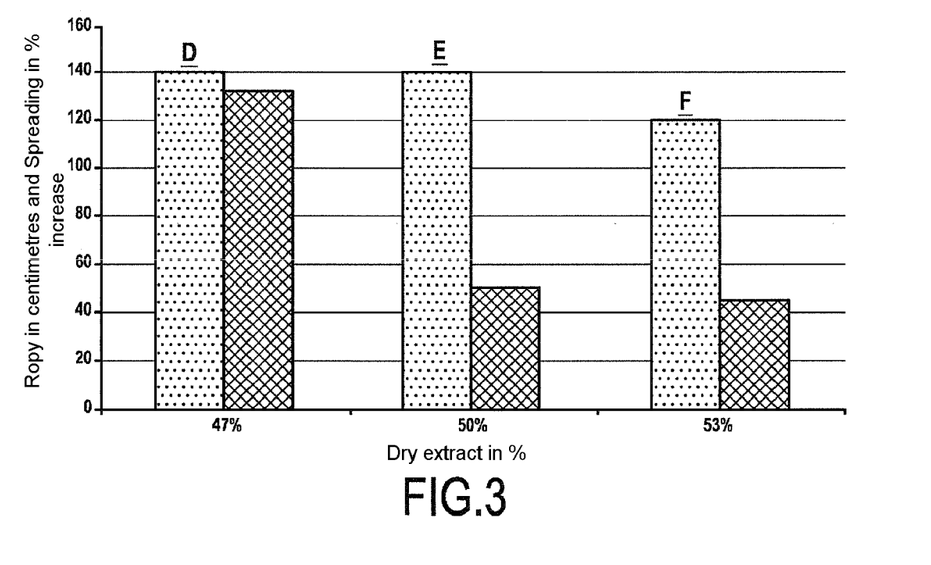
FIG. 3 is a graph of the spreading and ropy properties when cooked measured on cheeses by implementing the first example of the method of the invention. On the Y-axis are the ropy values in centimetres and the spreading values in % increase in relation to the dimensions of the initial sample, and on the X-axis are the various dry extracts of the cheeses tested (ratio of the weight of the dry matter to the total weight of the cheese)

The three base compositions disclosed in Table 2 above and corresponding to the cheeses D, E and F are implemented according to the first example of the method of the invention (advantageously with no whey separation step), disclosed above in reference to cheeses A, B and C. After 30 days of storage at 4° C., the results presented in the graph of FIG. 3 are obtained.

It is thus observed that cheese D having a dry extract of 47% has the best properties of spreading (140%) and ropy (about 130 cm). The ropy value decreases as the dry extract increases.

3. Description of a Second Example of the Production Method of the Invention for Producing a Mozzarella-Type Cheese.

The second example of the production method differs from the first example of the production method disclosed above in the weight ratio of the calcium to the TNM in the milk protein concentrates and the quantities of water, fat and milk protein concentrates in the base composition in step i). The base composition thus comprises 29.22 kg of water, 16.50 kg of powdered milk protein concentrates having a 78.5% weight ratio of total nitrogenous matter, and a lactose content less than or equal to 10%. The extra-white anhydrous milk fat (AMF) is added molten in two steps as disclosed in the first example of the production method, 4.50 kg of AMF is added in step i) and 9.0 kg of AMF is added under vacuum after the cooling step iii) at a temperature T5 of 45° C., in this specific example equal to the cooling temperature T4.

Figure 5:
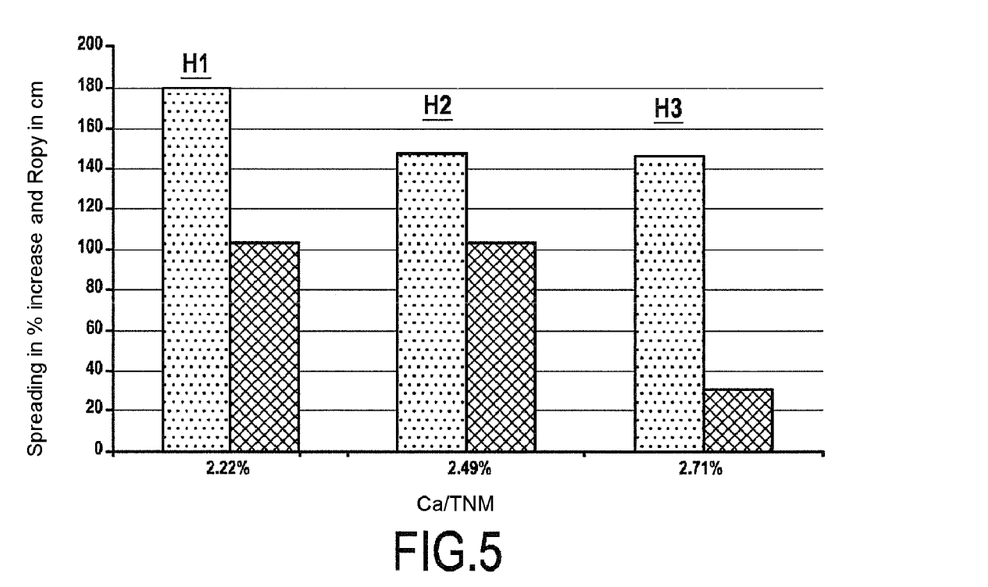
FIG. 5 is a graph of the spreading and ropy properties when cooked measured on cheeses by implementing the second example of the method of the invention. On the Y-axis are the ropy values in centimetres and the spreading values in % increase in relation to the dimensions of the initial sample, and on the X-axis are the ratios of the weight of calcium to the weight of the TNM in the powdered protein concentrates employed.

After 30 days of storage at 4° C., the results presented in the graph of FIG. 4 and the graph of FIG. 5 are obtained. The base composition for the cheeses H1, H2 and H3 shown in FIG. 5 differs from the base composition disclosed above and intended for the cheeses G1 to G4 in that it further comprises water and fat.

Advantageously, there is no whey separation step.

The graph of FIG. 4 shows the spreading and ropy properties when cooked obtained for the cheeses G1, G2, G3 and G4 produced with protein concentrates having, respectively, calcium to TNM weight ratios of 1.7%, 2.1%, 2.3% and 2.5% for a dry extract of 50% and a fat to dry matter ratio of 45%.

One notices that spreading is promoted with calcium/TNM ratios of 2.10% and below, in particular about 1.70% for which the spreading value obtained is close to that obtained for traditional mozzarella (i.e., produced from ordinary fresh milk products and not milk protein concentrates, in particular lactose and calcium depleted), for cheeses with 50% dry extract, 45% fat in dry matter and 21% TNM.

The graph of FIG. 5 shows the spreading and ropy properties when cooked obtained for the cheeses H1, H2 and H3 produced with protein concentrates having, respectively, calcium/TNM weight ratios of 2.22%, 2.49% and 2.71% for a dry extract of 46%, a TNM of 19.5% and a fat in dry matter ratio of 48%. One notices that the spreading obtained with 2.22% of Ca/TNM is close to the value of traditional mozzarella, or more than 180%. Moreover, the ropy obtained for the cheese H2 having a Ca/TNM content of 2.49% reached a ropy value of 120 cm, which is very close to that of more than about 120 cm obtained for the traditional mozzarella tested and acting as a control.

4. Third Example of the Production Method of the Invention for Producing a Mozzarella-Type Cheese I having a Dry Extract of 48%, a Fat in Dry Matter Ratio of 50%, a Calcium/TNM Weight Ratio of 2.00%, a Ratio of the Weight of the TNM to the Total Weight of the Cheese of 19%.

This third example of the method will be disclosed below from its differences with the first example of the method disclosed above.

This third example of the method differs from the first example of the method in the weight ratio of calcium to TNM in the milk protein concentrates and the quantities of water, fat and milk protein concentrates in the base composition in step i). The base composition thus comprises 31.02 kg of water, 14.60 kg of powdered milk protein concentrates, having a casein to TNM weight ratio of 90%, a TNM weight ratio of 81%, and a lactose content below 10%. The extra-white anhydrous milk fat (AMF) (9.0 kg) is added molten at a single time in step i) at a temperature T5 of 50° C.

Figure 6:
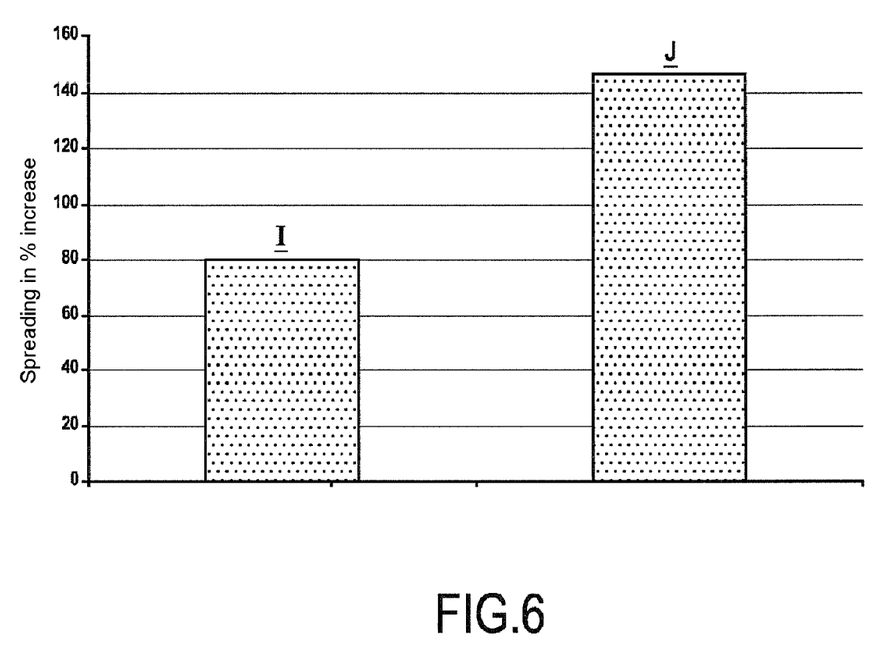
FIG. 6 is a graph of the spreading properties when cooked measured on cheeses by implementing a third and fourth examples of the method of the invention. On the Y-axis are the spreading values in % increase in relation to the dimensions of the initial sample, and on the X-axis are the values for a cheese I for which all the fats were added during step i) and a cheese J for which the fats were added in two steps, namely during step i) and after step iii).

After 30 days of storage at 4° C., the results presented in the graph of FIG. 6 are obtained. Advantageously, there is no whey separation step.

5. Fourth Example of the Production Method of the Invention for Producing a Mozzarella-Type Cheese J having a Dry Extract of 48%, a Fat in Dry Matter Ratio of 50%, a Calcium/TNM Weight Ratio of 2.00%, and a Ratio of the Weight of the TNM to the Total Weight of the Cheese of 19%

This fourth example of the method will be disclosed below from its differences with the first example of the method disclosed above.

This fourth example of the method differs from the first example of the method in the weight ratio of calcium to TNM in the milk protein concentrates and the quantities of water, fat and milk protein concentrates in the base composition in step i). The base composition thus comprises 31.02 kg of water, 14.60 kg of powdered milk protein concentrates, having a casein to TNM weight ratio of 90%, a TNM weight ratio of 81%, and a lactose content below 10%. The extra-white anhydrous milk fat (AMF) is added molten in two steps as disclosed in the first example of the production method, 4.80 kg of AMF is added in step i) and 9.60 kg of AMF is added under vacuum after the cooling step iii) at a temperature T5 of 45° C., in this specific example equal to the cooling temperature T4. TNM in the finished cheese (water) 19%.

After 30 days of storage at 4° C., the results presented in the graph of FIG. 6 are obtained. Advantageously, there is no whey separation step.

One thus observes that the addition of fat in two steps, in particular the addition of fat after the cooling step, under vacuum and molten, improves spreading by more than 75%.

The invention claimed is:

1. A method for producing a cheese having spreading and/or ropy properties when cooked, comprising:
   i) introducing a base composition comprising water, fat and milk protein concentrates into a solid-liquid mixer, wherein the milk protein concentrates comprise less than 10% by weight of lactose in relation to the total dry weight of the milk protein concentrates and wherein the percent by weight of the fat in the base composition is at least 15%;
   ii) operating the solid-liquid mixer at a stirring speed greater than or equal to 1500 rpm and a first temperature between 35° C. and 60° C., so as to emulsify and homogenize said base composition, then deaerating the base composition under vacuum, until a homogeneous, emulsified and deaerated dough, or pre-cheese mix, is obtained;
   iii) cooling the dough or pre-cheese mix at a second temperature below the first temperature,
   iv) adding one or more coagulating enzymes to the cooled dough or pre-cheese mix to cause coagulation in the cooled dough or pre-cheese mix, v) texturing the dough or pre-cheese mix, the texturing comprising the addition to said dough or pre-cheese mix of steam or hot water at a third temperature greater than or equal to 45° C., and vi) moulding and/or unmoulding the dough or pre-cheese mix, wherein said method does not comprise separating whey formed after addition of the one or more coagulating enzymes, and wherein a ratio between the weight of calcium and a total nitrogenous matter (TNM) in said milk protein concentrates is greater than or equal to 0.10% and less than or equal to 2.80%, wherein said method comprises a step of adding fat to the dough or pre-cheese mix before the texturing step v) and after the cooling step iii), wherein the quantity by weight of fat added after the cooling step iii) is greater than or equal to the quantity by weight of fat added to the base composition in step i), and wherein the fat is chosen from cream, butter, butter oil, anhydrous milk fat, palm oil, coconut oil, copra oil, soybean oil, and sunflower oil, wherein said palm oil, coconut oil, copra oil, soybean oil, and sunflower oil are in liquid form or partially or fully hydrogenated form.

2. The method according to claim 1, wherein the fat is added to the dough or pre-cheese mix, while the dough or pre-cheese mix is subjected to a vacuum.

3. The method according to claim 1, wherein the quantity by weight of fat added to the dough or pre-cheese mix after the cooling step iii) is greater than or equal to twice the quantity by weight of the total fat added to the base composition during step i).

4. The method according to claim 1, wherein the texturing comprises:
spinning and stretching the dough or pre-cheese mix.

5. The method according to claim 1, wherein a ratio between the weight of the calcium and the weight of the total nitrogenous matter (TNM) in the milk protein concentrates is between 1.20% and 2.80%.

6. The method according to claim 1, wherein the adding comprises the acidification of said cooled dough or pre-cheese mix at a pH greater than or equal to 5.10 and less than or equal to 5.40.

7. The method according to claim 1, wherein the dough or pre-cheese mix has a dry matter content of 40% to 65% by weight.

8. The method according to claim 1, wherein the milk protein concentrates have a casein/TNM weight ratio greater than 0.50.

9. The method according to claim 1, comprising a second cooling of the dough or pre-cheese mix at the conclusion of the texturing, the second cooling being performed using cold water and/or ice water.

10. The method according to claim 1, comprising a heat treatment step at the conclusion of step ii), and before step iii), during which the dough or pre-cheese mix is subjected to a temperature greater than or equal to 65° C.

11. A mozzarella cheese, produced according to the method of claim 1, wherein the mozzarella cheese has ropy and/or spreading properties when cooked, wherein the mozzarella cheese has a weight ratio of TNM to the mozzarella cheese of less than or equal to 21%, a weight ratio of dry matter to the total weight of said cheese of greater than or equal to 40%, and a weight ratio of calcium to the weight of the TNM in said mozzarella cheese between 0.10% and 2.80%.

12. The mozzarella cheese according to claim 11, having a pH greater than or equal to 5.10 and less than or equal to 5.40.

13. The method according to claim 1, wherein the second temperature is between 35° C. and 55° C.

14. The method according to claim 1, wherein one or more acidification ferments and/or one or more aromatic enzymes modifying rheological properties and/or one or more flavour-producing ferments and/or one or more acidifying agents, are added during the adding step.

15. The method according to claim 1, comprising grinding the dough or pre-cheese mix, the grinding being carried out prior to the texturing.

16. The method according to claim 4, wherein the spinning/stretching occurs after the addition of steam or hot water to the dough or pre-cheese mix obtained at the conclusion of the coagulation.

17. The method according to claim 5, wherein the ratio between the weight of the calcium and the weight of the total nitrogenous matter in the milk protein concentrates is between 1.70% and 2.70%.

18. The method according to claim 7, wherein the dough or pre-cheese mix has a dry matter content of 40% to 55% by weight.

19. The method according to claim 8, wherein the milk protein concentrates have a casein/TNM weight ratio greater than 0.70.

* * * * *